Oct. 21, 1958 — L. CORSO — 2,857,523
FLUOROSCOPIC DEVICE

Filed June 16, 1955 — 2 Sheets-Sheet 2

INVENTOR.
LEONARD CORSO
BY
Eldon H. Luther

2,857,523

FLUOROSCOPIC DEVICE

Leonard Corso, Port Washington, N. Y.

Application June 16, 1955, Serial No. 515,828

18 Claims. (Cl. 250—77)

This invention relates to fluoroscopes for use in the medical field for diagnostics and the like and has particular relation to such a fluoroscope having an image intensifier in combination with an improved optical system associated therewith.

Fluoroscopes have long been used by diagnosticians in observing various portions and functions of the human body such as the functions of glands and organs and the passage of matter through the alimentary tract or the intestines. However, the shadowy image produced by the fluoroscope and observed by the diagnostician has necessarily been very weak or dim because of the inherent limitations that are required as to the intensity of the X-ray dosage in order that the X-rays will not be harmful to the patient. In recent years electronic intensifiers have been successful in electronically producing a replica of the image formed upon the fluoroscope screen with this image being of greatly increased intensity or brightness and of reduced size relative to that appearing on the flloroscope screen. Notwithstanding this increased intensity however, the image produced by the intensifier is still very dim or weak so that prior to the present invention optical systems permitting the simultaneous viewing of the image to a magnified scale at two different and separate locations or the viewing of the image to a magnified scale at one location and the continuous photographing of the image by means of a motion picture camera at another location was not available and was thought to be impracticable because of the practical problems in the construction of such an optical system.

It is of course highly desirable that two diagnosticians be able to simultaneously view to a magnified scale the image produced by the electronic intensifier or to be able to simultaneously view this image and take motion pictures thereof. With the novel organization of the present invention, wherein a particular optical system which is constructed and arranged so that the adsorption and dispersion of light through the system and the optical elements thereof is maintained at a minimum in combination with a fluoroscope provided with an electronic intensifier, these desirable results are realized.

It is the object of this invention to provide an improved fluoroscopic device for medical use.

A further object of the invention is to provide an improved fluoroscopic device for medical use having in combination an electronic image intensifier and an optical system which provides for the simultaneous viewing of the image to magnified scale at two different and separate locations or the photographing of the image at one location and the viewing of the image to magnified scale at another location.

A further object of the invention is to provide an improved fluoroscopic device for medical use having in combination an electronic image intensifier and an optical system which includes two systems partially in tandem that provide for simultaneous viewing of the image to magnified scale at two different and separate locations and which systems are independently adjustable to vary the locations at which the image may be viewed.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment being shown by the accompanying drawings.

Figure 1:
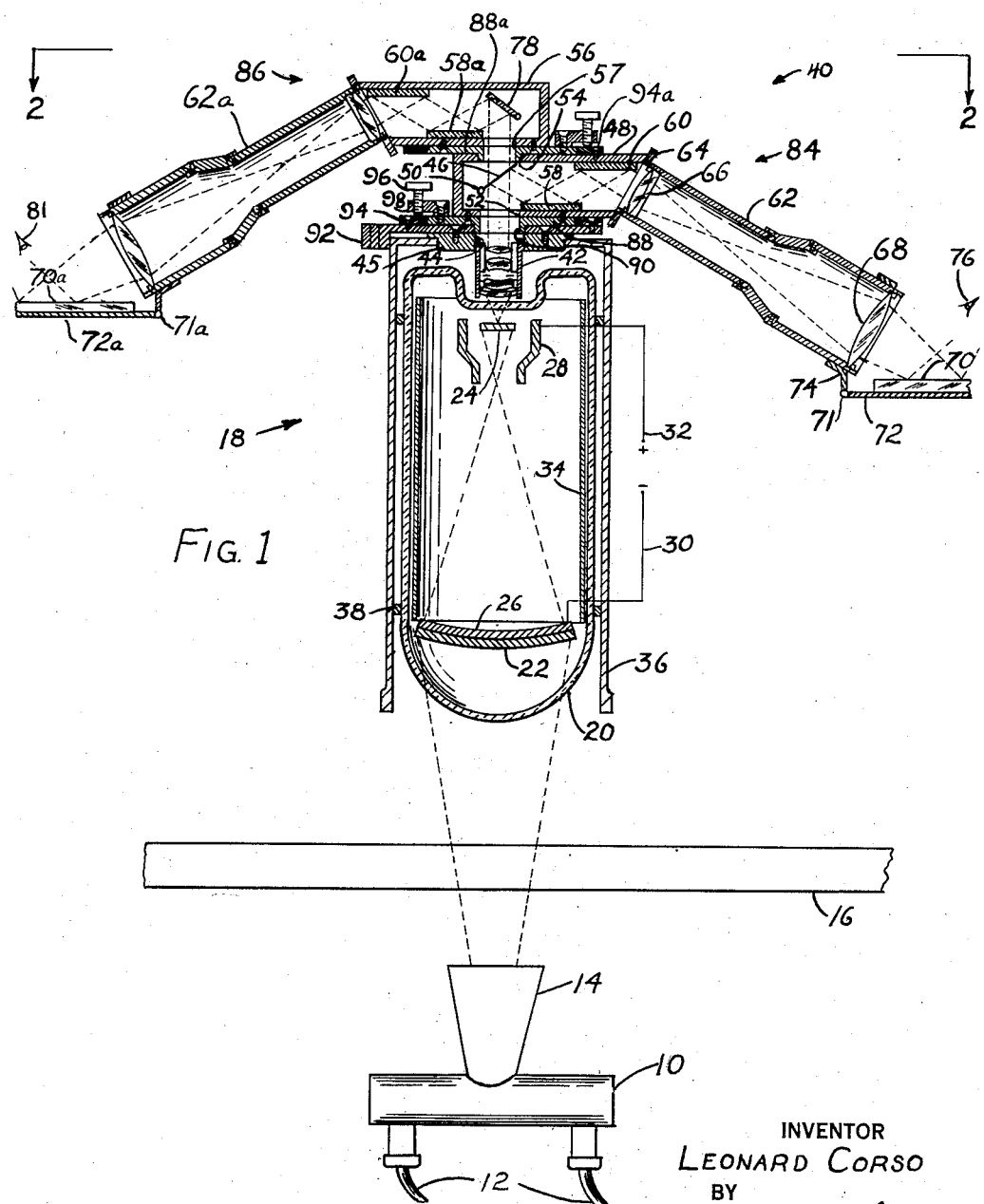
Figure 1 is a generally vertical section of a somewhat diagrammatical representation of a fluoroscopic device for medical use, embodying the present invention and including an electronic intensifier and an optical system whereby two observers may view the intensified image to an enlarged scale and at different locations, both of which are laterally offset from the path of the X-rays.
Figure 2:
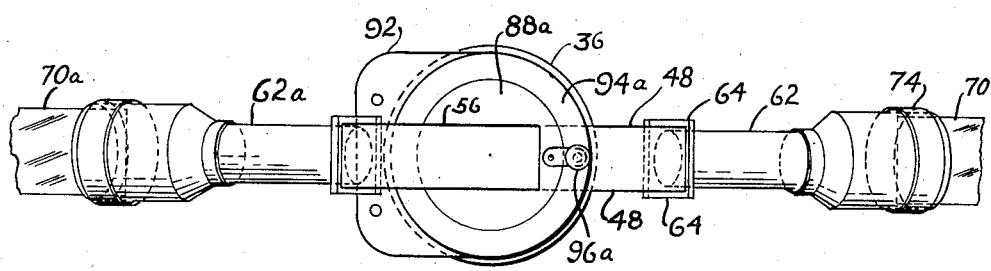
Figure 2 is a top view taken generally from line 2—2 of Figure 1.

Referring now to the drawings, wherein like characters are used throughout to designate like elements, and particularly to Figures 1 and 2, the illustrative organization depicted therein comprises an X-ray device 10 connected to a suitable source of potential through conductors 12 and effective to direct a stream of X-rays upwardly through the flared tubular portion 14. Directly above this tubular portion 14 and in the path of the X-rays is the table 16 which may be of a conventional construction normally used for supporting a patient for fluoroscopic observation, with the table together with the entire fluoroscope being adjustable so that it may be used in either the vertical or horizontal position with this latter being illustrated in the drawings.

Mounted above table 16, upon which the patient reposes, and in the path of the X-rays emanating from the X-ray device is the fluoroscopic organization designated generally 18 with this organization and X-ray device 10 being mounted so that they may be simultaneously moved or adjusted in both the horizontal and vertical direction with respect to table 16 in order to facilitate observation of the patient. This fluoroscopic organization comprises evacatued, glass tube 20 within which is mounted fluorescent screen 22 upon which the X-rays impinge thereby producing a dim shadow or shadowy image. Through electronic means this shadowy image is reproduced upon screen 24 with this image being completely reversed, i. e., upside down and backwards, with respect to that produced upon fluorescent screen 22. This electronic intensification is accomplished by positioning photo cathode plate 26 immediately in back of fluorescent screen 22 and annular anode 28 about screen 24 with a relatively high voltage, in the order of 25,000 volts, being impressed across the anode and cathode through conductors 30 and 32 as shown. Immediately adjacent the inner surface of tube 20 and extending intermediate the distance between cathode 26 and anode 28 is an annular conductive coating 34. By constructing tube 20 in this manner and impressing a high voltage across the anode and cathode the image received by and produced upon fluorescent screen 22 is converted to electrons which are accelerated and reconverged to produce an image upon screen 24 which is many times brighter than that produced upon fluorescent screen 22 and which is substantially reduced in size with the image produced upon this screen 24 having an area in the order of one quarter of a square inch.

The tube 20 is mounted within a suitable cylindrical housing 36 in spaced relation thereto through the medium of resilient spacers 38 compressed between the tube and the housing.

In order that the image produced upon screen 24 may be simultaneously viewed in a substantially magnified form by two observers at different locations each of which is located laterally with respect to the direction of X-ray radiation the optical system designated generally 40 is secured to and mounted upon the upper end of housing 36. This optical system includes an objective lens 42 which is unsymmetrical and of extremely large aperture with an f./2 Zeiss Biotar proving quite satisfactory. The mounting for the objective lens 42 is screwed into the threaded opening 44 provided in member 46 which is in turn threaded into the opening formed in the upper end of housing 36. The objective lens 42 is positioned with respect to screen 24 so that it is as close as possible to this screen while at the same time being optically at infinity relative to the screen (i. e. focused on the screen at infinity) so that the light from the image produced upon screen 24 and which passes through objective lens 42 will emerge from this lens as parallel light, traveling parallel to the axis of the objective lens. This parallel light that emerges from objective lens 42 impinges upon pellicle 46 mounted within housing 48 for pivotal adjustment about its axis 50 which extends transversely across housing 48 in a direction normal to the direction of travel of the parallel light. Housing 48 is provided with laterally opposed openings 52 and 54 coaxial with the objective lens 42 with the parallel light entering opening 52 and the portion of the light that passes through the pellicle passing out through opening 54.

The pellicle 46 is effective to reflect varying amounts of light according to the angle of incidence of the light with respect to the surface of the pellicle, with the pellicle preferably being adjusted about axis 50 to reflect approximately half of the light while permitting the other half to pass therethrough with its direction unchanged and with this portion of the light passing out through opening 54 in housing 48 and into housing 56 through the coaxial opening 57 provided in the bottom of this housing. The light reflected by the pellicle is directed downwardly upon reflector 58 from which it is directed upon reflector 60 mounted on the top of the housing with the parallel light being reflected generally outwardly and downwardly from this latter reflector and passing through telescope 62 which is mounted upon flange 64 provided at the outer end of housing 48 and which includes an achromatic objective 66 and eye piece 68 with the light emerging from the telescope being directed upon reflector 70 which is secured to support 72 pivotally mounted to bracket 74 secured to the end of the telescope.

In order that the optical system may be properly adjusted each of the reflectors 58 and 60 is mounted within housing 46 in a manner providing limited universal movement with reflector 70 also being mounted in a manner which permits universal movement with the latter being achieved by securing bracket 74 to the end of telescope 62 by means of a clamping band or the like which permits the band to be rotated about the axis of the telescope and which together with the pivotal connection of support 72 to bracket 74 permits universal adjustment of the reflector.

When the optical system is in adjustment to produce an image that may be observed from a location such as 76 each of the reflecting surfaces of reflectors 58, 60 and 70 is intersected by and normal to the plane that is normal to the surface of pellicle 46 and passes through the axis of objective lens 42 and accordingly through the center of the pellicle. Adjustment of reflector 70 about axis 71, which is normal to the aforementioned plane, accommodates varying location 76 vertically.

The light that passes through the pellicle and into housing 56 through opening 57 in this housing impinges upon the obliquely disposed reflector 78 adjustably mounted within housing 56 to reflect the light downwardly upon reflector 58a which in turn directs the light upon reflector 60a with the light being directed from this reflector through telescope 62a and upon reflector 70a. The reflectors 58a, 60a and 70a together with telescope 62a are similar to the corresponding elements of the previously described optical system and are effective to produce an image visible to an observer at the location 81.

Since the image produced on the screen 24 is completely reversed, it is necessary to again completely reverse this image in order for the image that is seen by the observer to be properly oriented with it having been determined by experience that it is highly desirable if not essential that the image viewed by the diagnostician be correctly oriented, i. e., be neither upside down nor backwards. With the optical system of the invention, the image seen by the observers at the locations 76 and 81 are both correctly oriented as well as substantially magnified with respect to the image appearing on screen 24. This is achieved by providing four reflecting surfaces in each of these optical systems from which the light received from the image on screen 24 is reflected with each of the reflectors in each system being positioned so as to be intersected by and greatly normal to a common plane and by providing each system with a telescope which effects a complete reversal and a magnification of the image. The objective lens 42 does not reverse the image at all but merely transforms the light which it receives from the image produced upon the screen 24 into parallel light. In the case of the first optical system, which is designated generally 84, the image is successively reversed in a single direction only by the pellicle 46 and the reflectors 58, 60 and 70 with the single direction of reversing the image by each of these members being the same so that these reflecting surfaces effectively cancel each other insofar as reversing the image is concerned and since telescope 62 effects a complete reversal the image produced upon screen 24 as observed by the observer at 76 is completely reversed and accordingly of the same orientation as the image produced upon fluorescent screen 22.

The other optical system, which is designated generally 86, is similar to optical system 84 insofar as the number and disposition of reflectors is concerned and insofar as the effect and location of the telescope is concerned so that the image seen by the observer at 81 is likewise of the same orientation as the image produced upon fluorescent screen 22.

Since the fluoroscope must be usable both in the vertical position, i. e., when the patient is lying horizontally on the table 16, and in a horizontal position, i. e., when the patient is standing vertically against the table 16, it is necessary that the two optical systems 84 and 86 be adjustable so that they are in a position convenient for viewing by the diagnostician. This is achieved by mounting the housings 48 and 56, respectively, in a manner so that they may be adjustably rotated about the axis of the objective lens 42.

As embodied, this is achieved by securing housing 56 to the annular member 88 which is provided with the centrally depending lip 90 that extends into a suitable opening provided in bracket 92 which is in turn secured to member 45 with this opening being coaxial with lens 42 and opening 44. The periphery of annular member 88 is tapered, as shown, and complementary to the inner tapered surface of ring 94 which is secured to bracket 92. This construction is such that annular member 88 is normally rotatable within ring 94 thereby providing for rotation of housing 48 about the axis of lens 42. However, when it is desired to secure the housing 48 in a particular rotative position thumb screw 96, which is threadedly received in bracket 98, that is secured to and extends laterally from annular member 88, is screwed down against upper surface of ring 94 bringing the coacting tapered surfaces of member 88 and ring 94 tightly into engagement and thereby preventing further rotation of housing 48. Housing 56 is similarly rotatively mounted with this housing being secured to annular member 88a which has a depending lip extending into opening 54 provided in the upper wall of housing 48 with the periphery of this member being tapered and in complementary relation with the tapered inner surface of ring 94a which is secured to the upper wall of housing 48. The relation between ring 94a and the annular member 88a normally permits rotation of housing 56 about the axis of lens 42 with this housing being maintained in a desired rotative position through the action of thumb screw 96a in the same manner as previously described.

Thus with this organization each of the optical systems 84 and 86 may be independently rotated about the axis of lens 42 and may be maintained in a desired rotative position so that the fluoroscope may be used when in the horizontal or vertical position or any position intermediate the horizontal or vertical positions with the optical systems being readily adjustable so that the observer can conveniently see the image reflected from the surface of reflector 70 and the surface of reflector 70a.

Because of the weakness of the image produced upon screen 24 it is absolutely essential that there be as little adsorption and dispersion of the light as possible throughout the optical systems and the elements of the optical system. In accordance with the present invention, the lens 42 is of very large aperture so that it may be positioned very close to screen 24 and achieve its purpose of producing parallel light with pellicle 46 being as close to this lens as physical limitations will permit and with the reflectors 58 and 60 accordingly being positioned so that the light travels as short a distance as is physically possible and still construct a workable apparatus. The reflectors 78 and 58a and 60a are likewise mounted so that the light that passes through pellicle 46 and impinges upon and is reflected by these reflectors travels for as short a distance as is physically possible.

It is absolutely essential that each of the reflecting surfaces 58, 60 and 70 as well as 78, 58a, 60a and 70a be front faced reflectors so that there will be not double reflections as is common with rear faced reflectors and also so that there will be no adsorption of the light such as would be had in passing through the glass thickness of a rear faced reflector. If rear faced reflectors were used the resulting double images would make the device useless for the purpose of diagnostics since with the relative weakness of the image that is produced upon screen 24 and is being magnified and viewed at locations 76 and 81 details would be completely undiscernible if such double images were produced.

For the foregoing reasons, i. e. that light adsorption must be kept at a minimum and there be no double images produced by reflection, it is also essential that a pellicle be used as the transparent reflecting surface with the term pellicle as used throughout this application designating an extremely thin membrane which is capable of reflecting a portion of the light, depending upon the angle at which the light strikes the surface of the membrane, while permitting the remainder of the light to pass therethrough with the thickness of the membrane being in the order of a few thousandths of an inch so that it neither adsorbs nor reflects the light in passing therethrough to any appreciable extent. A half silvered mirror, as is commonly used as a semi-reflector would be totally unsuitable and would result in an inoperative device.

Figure 3:
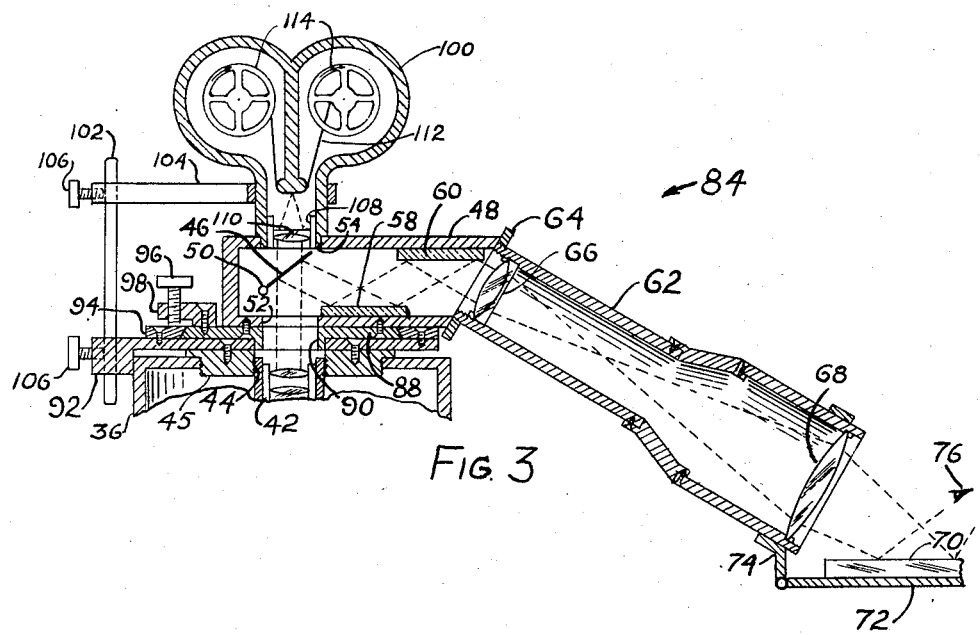
Figure 3 is a view of a modified form of optical system for use with the fluoroscope and image intensifier of Figure 1 and whereby the intensified image may be viewed to enlarged scale by an observer and may be simultaneously photographed by a movie camera.

The modified embodiment depicted in Figure 3 is similar to that of Figures 1 and 2 except that a camera is substituted for optical system 86 in order that motion pictures may be simultaneously taken of the image appearing on screen 24 while this image is being viewed by the observer at 76. In this Figure 3 embodiment, motion picture camera 100 is mounted upon a pair of spaced support rods 102 (one such rod being shown in the drawing) with the lower end of these rods being received in suitable bores provided in bracket 92 while the upper ends are received in suitable bores provided in laterally extending support bracket 104. These rods are securely held within their respective bores by set screws 106 which permit the camera to be vertically adjusted along the support rods and when the camera is in place lens mounting 108 is disposed within opening 54 in the top of housing 48 as shown so that the light that passes through pellicle 46 is focused by lens 110 upon the film strip 112 that passes from one of the reels 114 to the other with the construction of this camera being in accordance with conventional camera designs for the taking of moving pictures wherefore only a diagrammatic representation of the camera has been shown with details of construction being omitted. With this Figure 3 modification the image produced upon screen 24 may thus be simultaneously viewed at 76 and photographed by the motion picture camera 100.

Since the camera is mounted from bracket 92 through rods 102 the camera does not rotate with housing 48 as it is rotated about the axis of lens 42 to various desired positions but remains stationary with respect to tube 20 and accordingly in a predetermined orientation with table 16 and a patient reposing thereon. Thus with the camera initially positioned in a predetermined position so that the pictures when projected by a suitable projector upon a view screen will be of a desired orientation with respect to the patient, this desired orientation is maintained even though optical system 84 is rotated about the axis of lens 42 to various positions to suit the convenience of the observer.

While I have illustrated and described a preferred embodiment of my novel organization it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What is claimed is:

1. In combination, a fluoroscope for medical use having an X-ray source, a fluorescent screen upon which said X-rays are directed after passage through the body thereby forming an image on said screen, an electronic intensifier effective to produce a luminous intensified completely reversed replica of said image to reduced scale, an extremely fast wide apertured objective lens positioned to receive light from said luminous image and transform the same to parallel light, a pellicle on the optical axis of said objective lens with its surface disposed at an angle relative thereto so that a portion of the light is reflected laterally of said axis while the remainder continues in parallel relation with said axis, optical means receiving this reflected light and effective to produce a correctly oriented image and including a front faced reflector the surface of which is generally normal to and intersected by the central plane generally normal to the pellicle and a lens means operative to completely reverse and invert the image it receives, an additional optical system receiving the light passing through the pellicle and including a lens means effective to completely reverse and invert the image it receives with this optical system likewise being constructed and arranged to produce a correctly oriented image.

2. In combination, a fluoroscope for medical use having an X-ray source, a fluorescent screen upon which said X-rays are directed after passage through the body thereby forming an image on said screen, an electronic intensifier effective to produce a luminous intensified completely reversed replica of said image to reduced scale, an extremely fast wide apertured objective lens positioned to receive light from said luminous image and transform the same to parallel light, a pellicle on the optical axis of said objective lens with its surface disposed at an angle relative thereto so that a portion of the light is reflected laterally of said axis while the remainder continues in parallel relation with said axis, optical means receiving this reflected light and effective to produce a correctly oriented image and including a front faced reflector effective to reverse the image in the direction that the pellicle reversed it and lens means effective to completely reverse the image and magnify the image, an additional optical system receiving the light passing through the pellicle and including a lens means effective to completely reverse and invert the image it receives with this optical system likewise being constructed and arranged to produce a correctly oriented image, said pellicle and said optical means being constructed and arranged to be adjustably rotated in unison about the axis of the objective lens and independently of said additional optical system.

3. In combination, a fluoroscope for medical use having an X-ray source, a fluorescent screen upon which said X-rays are directed after passage through the body thereby forming an image on said screen, an electronic intensifier effective to produce a luminous intensified completely reversed replica of said image to reduced scale, a fast objective lens positioned to receive light from said luminous image and transform the same to parallel light, a pellicle on the optical axis of said objective lens with its surface disposed at an angle relative thereto so that a portion of the light is reflected laterally of said axis while the remainder continues in parallel relation with said axis, a first front faced reflector receiving and reflecting the reflected light from the pellicle, a second front faced reflector receiving and reflecting this light from said first reflector, a telescope including an objective lens and an eye piece through which the light reflected from this second reflector is passed with the image being completely reversed and inverted and magnified by the telescope and a third front faced reflector upon which the light that emerges from the telescope is impinged, each of said reflecting surfaces being generally normal to the plane that contains the axis of the objective lens and is normal to the surface of the pellicle, and optical means receiving the light passing through said pellicle.

4. In combination, a fluoroscope for medical use having an X-ray source, a fluorescent screen upon which said X-rays are directed after passage through the body thereby forming an image on said screen, an electronic intensifier effective to produce a luminous intensified completely reversed replica of said image to reduced scale, a fast objective lens positioned to receive light from said luminous image and transform the same to parallel light, a pellicle on the optical axis of said objective lens with its surface disposed at an angle relative thereto so that a portion of the light is reflected laterally of said axis while the remainder continues in parallel relation with said axis, a first front faced reflector receiving and reflecting the reflected light from the pellicle, a second front faced reflector receiving and reflecting this light from said first reflector, a telescope including an objective lens and an eye piece through which the light reflected from this second reflector is passed with the image being completely reversed and inverted and magnified by the telescope and a third front faced reflector upon which the light that emerges from the telescope is impinged, each of said reflectors being so disposed relative to each other as to reverse the image in the same direction, whereby the image as deflected from the third reflector is correctly oriented, and additional optical means receiving the light passing through the pellicle and including a lens means effective to completely reverse the image it receives with this optical means likewise being constructed and arranged to produce a correctly oriented image.

5. In combination, a fluoroscope for medical use having an X-ray source, a fluorescent screen upon which said X-rays are directed after passage through the body thereby forming an image on said screen, an electronic intensifier effective to produce a luminous intensified completely reversed replica of said image to reduced scale, a fast objective lens positioned to receive light from said luminous image and transform the same to parallel light, a pellicle on the optical axis of said objective lens with its surface disposed at an angle relative thereto so that a portion of the light is reflected laterally of said axis while the remainder continues in parallel relation with said axis, a first front faced reflector receiving and reflecting the reflected light from the pellicle, a second front faced reflector receiving and reflecting this light from said first reflector, a telescope including an objective lens and an eye piece through which the light reflected from this second reflector is passed with the image being completely reversed and inverted and magnified by the telescope and a third front faced reflector upon which the light that emerges from the telescope is impinged, each of said reflecting surfaces being generally normal to the plane that contains the axis of the objective lens and is normal to the surface of the pellicle, and optical means receiving the light passing through said pellicle, said pellicle and the first and second reflectors being disposed in a passageway extending laterally of the optical axis of the objective and which is mounted to be adjustably rotated about said axis, said telescope being secured to the end of said passageway at an angle thereto with the third reflector depending from the end of the telescope.

6. In combination, a fluoroscope for medical use having an X-ray source, a fluorescent screen upon which said X-rays are directed after passage through the body thereby forming an image on said screen, an electronic intensifier effective to produce a luminous intensified completely reversed replica of said image to reduced scale, a fast objective lens positioned to receive light from said luminous image and transform the same to parallel light, a pellicle on the optical axis of said objective lens with its surface disposed at an angle relative thereto so that a portion of the light is reflected laterally of said axis while the remainder continues in parallel relation with said axis, a first front faced reflector receiving and reflecting the reflected light from the pellicle, a second front faced reflector receiving and reflecting this light from said first reflector, a telescope including an objective lens and an eye piece through which the light reflected from this second reflector is passed with the image being completely reversed and inverted and magnified by the telescope and a third front faced reflector upon which the light that emerges from the telescope is impinged, each of said reflecting surfaces being generally normal to the plane that contains the axis of the objective lens and is normal to the surface of the pellicle, said third front faced reflector being mounted for pivotal adjustment about an axis normal to said plane, and optical means receiving the light passing through said pellicle.

7. In combination, a fluoroscope for medical use having an X-ray source, a fluorescent screen upon which said X-rays are directed after passage through the body thereby forming an image on said screen, an electronic intensifier effective to produce a luminous intensified completely reversed replica of said image to reduced scale, a fast objective lens positioned to receive light from said luminous image and transform the same to parallel light, a pellicle on the optical axis of said objective lens with its surface disposed at an angle relative thereto so that a portion of the light is reflected laterally of said axis while the remainder continues in parallel relation with said axis, a first front faced reflector receiving and reflecting the reflected light from the pellicle, a second front faced reflector receiving and reflecting this light from said first reflector, a telescope including an objective lens and an eye piece through which the light reflected from this second reflector is passed with the image being completely reversed in inverted and magnified by the telescope and a third front faced reflector upon which the light that emerges from the telescope is impinged, each of said reflectors being so disposed relative to each other as to reverse the image in the same direction, whereby the image as reflected from the third reflector is correctly oriented, and additional optical means receiving the light passing through the pellicle and including a lens means effective to completely reverse the image it receives with this optical means likewise being constructed and arranged to produce a correctly oriented image, said pellicle, said reflectors and said telescope being constructed and arranged to be rotatively adjusted in unison about the axis of the objective lens.

8. The organization of claim 7 wherein said third reflector is mounted on the end of said telescope for pivotal adjustment about an axis normal to the plane containing the axis of the objective lens and normal to the surface of the pellicle.

9. In combination, a fluoroscope for medical use having an X-ray source, a fluorescent screen upon which said X-rays are directed after passage through the body thereby forming an image on said screen, an electronic intensifier effective to produce a luminous intensified completely reversed replica of said image to reduced scale, a fast objective lens positioned to receive light from said luminous image and transform the same to parallel light, a pellicle on the optical axis of said objective lens with its surface disposed at an angle relative thereto so that a portion of the light is reflected laterally of said axis while the remainder continues in parallel relation with said axis, a housing forming a passageway laterally disposed with respect to the optical axis of said objective, said housing being mounted for adjustment about said axis with said pellicle being mounted in one end of said passageway and with said passageway having lateral openings coaxial with the optical axis of the objective, a pair of front faced reflectors positioned within said passageway and successively disposed in the path of the reflected light from the pellicle, said reflectors being arranged to project this parallel light laterally from the other end of said passageway, a telescope secured to said other end of the housing and in the path of said reflected light, said telescope magnifying and completely reversing the image, and a front faced reflector depending from said telescope in the path of the light emerging therefrom to reflect the same to the eye of an observer, each of said front faced reflectors having their reflecting surfaces generally normal to a common plane generally normal to the surface of the pellicle, the last named reflector being mounted for pivotal adjustment about an axis normal to said plane, and optical means receiving the light passing through the pellicle and effective to produce a correctly oriented image with said means including a lens operative to completely reverse the image it receives.

10. In combination, a fluoroscope for medical use having an X-ray source, a fluorescent screen upon which said X-rays are directed after passage through the body thereby forming an image on said screen, an electronic intensifier effective to produce a luminous intensified completely reversed replica of said image to reduced scale, a fast objective lens positioned to receive light from said luminous image and transform the same to parallel light, a pellicle on the optical axis of said objective lens with its surface disposed at an angle relative thereto so that a portion of the light is reflected laterally of said axis while the remainder continues in parallel relation with said axis, a housing forming a passageway laterally disposed with respect to the optical axis of said objective, said housing being mounted for adjustment about said axis with said pellicle being mounted in one end of said passageway and with said passageway having lateral openings coaxial with the optical axis of the objective, a pair of front faced reflectors positioned within said passageway and successively disposed in the path of the reflected light from the pellicle, said reflectors being arranged to project this parallel light laterally from the other end of said passageway, a telescope secured to said other end of the housing and in the path of said reflected light, said telescope magnifying and completely reversing the image, and a front faced reflector depending from said telescope in the path of the light emerging therefrom to reflect the same to the eye of an observer, each of said front faced reflectors having their reflecting surfaces generally normal to a plane containing the axis of the objective lens and normal to the surface of the pellicle, the last named reflector being mounted for pivotal adjustment about an axis normal to said plane, a camera disposed with its lens adjacent said pellicle and coaxial with said objective so as to receive the parallel light passing through the pellicle, and project it upon a light sensitive medium, said camera being fixedly mounted with respect to said intensified image.

11. In combination, a fluoroscope for medical use having an X-ray source, a fluorescent screen upon which said X-rays are directed after passage through the body thereby forming an image on said screen, an electronic intensifier effective to produce a luminous intensified completely reversed replica of said image to reduced scale, an extremely fast wide apertured objective lens positioned to receive light from said luminous image and transform the same to parallel light, a pellicle on the optical axis of said objective lens with its surface disposed at an angle relative thereto so that a portion of the light is reflected laterally of said axis while the remainder continues in parallel relation with said axis, optical means receiving this refletced light and effective to produce a correctly oriented image and including a front faced reflector effective to reverse the image in the direction that the pellicle reversed it and lens means effective to completely reverse the image and magnify the image, a camera receiving the light passing through the pellicle with its objective coaxial with the first mentioned objective so as to receive the parallel light passing through the pellicle and project it upon a light sensitive medium, said camera being fixedly mounted with respect to said intensified image, said pellicle and said optical means being constructed and arranged to be adjustably rotated in unison about the axis of the objective lens and relative to and independently of said camera.

12. In combination, a fluoroscope for medical use having an X-ray source, a fluorescent screen upon which said X-rays are directed after passage through the body thereby forming an image on said screen, an electronic intensifier effective to produce a luminous intensified completely reversed replica of said image to reduced scale, a fast objective lens positioned to receive light from said luminous image and transform the same to parallel light, a pellicle on the optical axis of said objective lens with its surface disposed at an angle relative thereto so that a portion of the light is reflected laterally of said axis while the remainder continues in parallel relation with said axis, a front faced reflector disposed in the path of the light passing through said pellicle with its surface at an angle with respect thereto, to reflect said light laterally of the axis of said objective lens, first and second optical means for receiving the light reflected from said pellicle and said reflector, respectively, and operative to make the image visible to enlarged scale at two separate locations laterally of the axis of said objective, each of said optical means including a front faced reflector and a lens means with the lens means being effective to completely reverse the image and with the reflector of the optical means associated with the pellicle being effective to reverse the image in the same direction as the pellicle reversed it while that associated with the first named reflector being effective to reverse the image in the same direction as the first named reflector.

13. In combination, a fluoroscope for medical use having an X-ray source, a fluorescent screen upon which said X-rays are directed after passage through the body thereby forming an image on said screen, an electronic intensifier effective to produce a luminous intensified completely reversed replica of said image to reduced scale, a fast objective lens positioned to receive light from said luminous image and transform the same to parallel light, a pellicle on the optical axis of said objective lens with its surface disposed at an angle relative thereto so that a portion of the light is reflected laterally of said axis while the remainder continues in parallel relation with said axis, a front faced reflector disposed in the path of the light passing through said pellicle with its surface at an angle with respect thereto, to reflect said light laterally of the axis of said objective lens, first and second optical means for receiving the light reflected from said pellicle and said reflector, respectively, and operative to make the image visible to enlarged scale at two separate locations laterally of the axis of said objective, each of said optical means including a lens means with the lens means being effective to completely reverse the image and with the reflector of the optical means associated with the pellicle being effective to reverse the image in the same direction as the pellicle reversed it while that associated with the first named reflector being effective to reverse the image in the same direction as the first named reflector, said pellicle and said first optical means being mounted for rotational adjustment in unison about the axis of the objective lens, and said first named reflector and said second optical means being mounted for rotational adjustment in unison about the axis of the objective lens and independently of said first optical means.

14. In combination, a fluoroscope for medical use having an X-ray source, a fluorescent screen upon which said X-rays are directed after passage through the body thereby forming an image on said screen, an electronic intensifier effective to produce a luminous intensified completely reversed replica of said image to reduced scale, a fast objective lens positioned to receive light from said luminous image and transform the same to parallel light, a pellicle on the optical axis of said objective lens with its surface disposed at an angle relative thereto so that a portion of the light is reflected laterally of said axis while the remainder continues in parallel relation with said axis, a front faced reflector disposed in the path of the light passing through said pellicle with its surface at an angle with respect thereto, to reflect said light laterally of the axis of said objective lens, first and second optical means for receiving the light reflected from said pellicle and said reflector, respectively, and operative to make the image visible to enlarged scale at two separate locations laterally of the axis of said objective, said optical means including a first front faced reflector receiving and reflecting the reflected light, a second front faced reflector receiving and reflecting this light from said first reflector, a telescope through which the light reflected from this second reflector is passed with the image being completely reversed and inverted and magnified by the telescope and a third front faced reflector upon which the light that emerges from the telescope is impinged, the reflectors in said first optical means being so disposed that the pellicle and each of the reflectors reverses the image in the same direction, the reflectors in the second optical system being so disposed that each of these reflectors and the first named reflector reverse the image in the same direction.

15. In combination, a fluoroscope for medical use having an X-ray source, a fluorescent screen upon which said X-rays are directed after passage through the body thereby forming an image on said screen, an electronic intensifier effective to produce a luminous intensified completely reversed replica of said image to reduced scale, a fast objective lens positioned to receive light from said luminous image and transform the same to parallel light, a pellicle on the optical axis of said objective lens with its surface disposed at an angle relative thereto so that a portion of the light is reflected laterally of said axis while the remainder continues in parallel relation with said axis, a front faced reflector disposed in the path of the light passing through said pellicle with its surface at an angle with respect thereto, to reflect said light laterally of the axis of said objective lens, first and second optical means for receiving the light reflected from said pellicle and said reflector, respectively, and operative to make the image visible to enlarged scale at two separate locations laterally of the axis of said objective lens, first and second optical means for receiving the light reflected from said pellicle and said reflector, respectively, and operative to make the image visible to enlarged scale at two separate locations laterally of the axis of said objective, each of said optical means including a first front faced reflector receiving and reflecting the reflected light, a second front faced reflector receiving and reflecting this light from said first reflector, a telescope through which the light reflected from this second reflector is passed with the image being completely reversed and inverted and magnified by the telescope and a third front faced reflector upon which the light that emerges from the telescope is impinged, the reflectors in said first optical means being so disposed that the pellicle and each of the reflectors reverses the image in the same direction, the reflectors in the second optical system being so disposed that each of these reflectors and the first named reflector reverse the image in the same direction, said first optical system and said pellicle being constructed and arranged to be adjustably rotated in unison about the axis of the objective lens, and said second optical system and the first named reflector being constructed and arranged to be adjustably rotated in unison about the axis of the objective lens.

16. The organization of claim 15 wherein the third front faced reflector associated with each of the optical means is mounted on the end of the telescope for pivotal adjustment about an axis, with that associated with the first optical means being normal to a plane containing the axis of the objective lens and normal to the surface of the pellicle and that associated with the second optical means being normal to a plane containing the axis of the objective lens and normal to the first named reflector.

17. A device for fluoroscopic observation of the human body comprising in combination a source for producing energy rays, a fluorescent screen upon which said rays are directed after passage through the body thereby forming an image on said screen, an electronic intensifier effective to produce a luminous intensified replica of said image to a reduced scale, an extremely fast wide apertured objective lens positioned to receive light from said luminous image and transform the same to parallel light, a pellicle on the optical axis of said objective lens and disposed at an angle relative thereto so that a portion of the light is reflected laterally of said axis while the remaining portion continues in parallel relation thereto, optical means receiving this reflected light and effective to produce a magnified correctly oriented image offset from the axis of said objective lens, means for effecting simultaneous rotation of said pellicle and optical means about the axis of said objective lens thereby varying the location of the image formed by said optical means while retaining the same correctly oriented, an additional optical means receiving the light passing through the pellicle and effective to form an image.

18. A device for fluoroscopic observation of the human body comprising in combination a source for producing X-rays, a fluorescent screen upon which said rays are directed after passage through the body thereby forming an image on said screen, an electronic intensifier effective to produce a luminous intensified replica of said image to a reduced scale, an extremely fast wide apertured objective lens positioned to receive light from said luminous image and transform the same into parallel light, a pellicle on the optical axis of said objective lens and disposed at an angle relative thereto so that a portion of the light is reflected laterally of said axis while the remaining portion passes through the pellicle, optical means receiving this reflected light and effective to produce a magnified correctly oriented image offset from the axis of said objective lens, a camera receiving said light passing through the pellicle and including lens means producing an image, means for supporting said camera and effective to orient it in predetermined relation with said luminous image, and means for effecting simultaneous rotation of said pellicle and said optical means about the axis of said objective lens and independently of said camera thereby varying the location of the image formed by said optical means while retaining the same correctly oriented.

References Cited in the file of this patent

UNITED STATES PATENTS

| | | |
|---|---|---|
| 1,166,343 | Fielding | Dec. 28, 1915 |
| 1,642,915 | Adrian | Sept. 20, 1927 |
| 2,041,194 | Lindenberg | May 19, 1936 |
| 2,041,195 | Lindenberg | May 19, 1936 |
| 2,352,976 | Schaefer | July 4, 1944 |
| 2,392,428 | Swift | Jan. 8, 1946 |
| 2,465,263 | Pedrick | Mar. 22, 1949 |
| 2,472,809 | Decker | June 14, 1949 |
| 2,560,085 | Clausing | July 10, 1951 |
| 2,631,244 | Longini | Mar. 10, 1953 |
| 2,673,492 | Reswick | Mar. 30, 1954 |
| 2,705,758 | Kaprelian | Apr. 5, 1955 |
| 2,743,195 | Longini | Apr. 24, 1956 |
| 2,812,687 | Eitel et al. | Nov. 12, 1957 |